United States Patent [19]
Leblanc

[11] 3,906,143
[45] Sept. 16, 1975

[54] DAMPER SPACER FOR BUNDLE CONDUCTOR

[75] Inventor: Leopold Leblanc, Victoriaville, Canada

[73] Assignee: Roger Beaudoin, Lyster, Canada

[22] Filed: July 26, 1974

[21] Appl. No.: 492,021

[52] U.S. Cl............ 174/42; 24/132 CS; 24/248 SL; 174/146; 188/1 B; 248/74 R; 267/136
[51] Int. Cl.²....................... H02G 7/14; H02G 7/12
[58] Field of Search............. 174/42, 146, 154, 155; 24/132 R, 132 CS, 132 HA, 248 L, 248 SL, 249 SL, 262 R; 188/1 B; 248/61, 62, 74 R, 74 A, 74 B, 226 C, 316 B; 267/136

[56] References Cited
UNITED STATES PATENTS

| | | | |
|---|---|---|---|
| 459,658 | 9/1891 | Schuster | 248/62 X |
| 851,505 | 4/1907 | Ernst | 248/62 X |
| 3,157,731 | 11/1964 | Torr | 174/146 X |
| 3,260,789 | 7/1966 | Edwards | 174/146 X |
| 3,454,705 | 7/1969 | Crosby et al. | 174/146 X |

FOREIGN PATENTS OR APPLICATIONS

| | | | |
|---|---|---|---|
| 1,076,421 | 7/1967 | United Kingdom | 174/146 |

*Primary Examiner*—Laramie E. Askin

[57] ABSTRACT

A damper spacer for use with bundle conductors comprises a massive centrally disposed main body member, from which outwardly extend radially and in coplanar relationship, a number of long radial arm members each of which is essentially made from a single length of high tensile strength steel rod and presents a long outwardly extending stem like outer portion and a helically formed spring like portion adjacent the point at which it originates from the main body member; at the other end of the stem like outer portion of each radial arm member there is provided a conductor gripping device.

4 Claims, 7 Drawing Figures

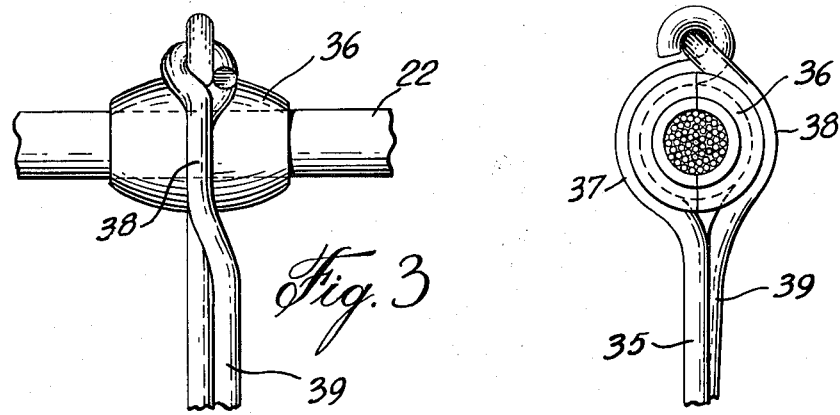
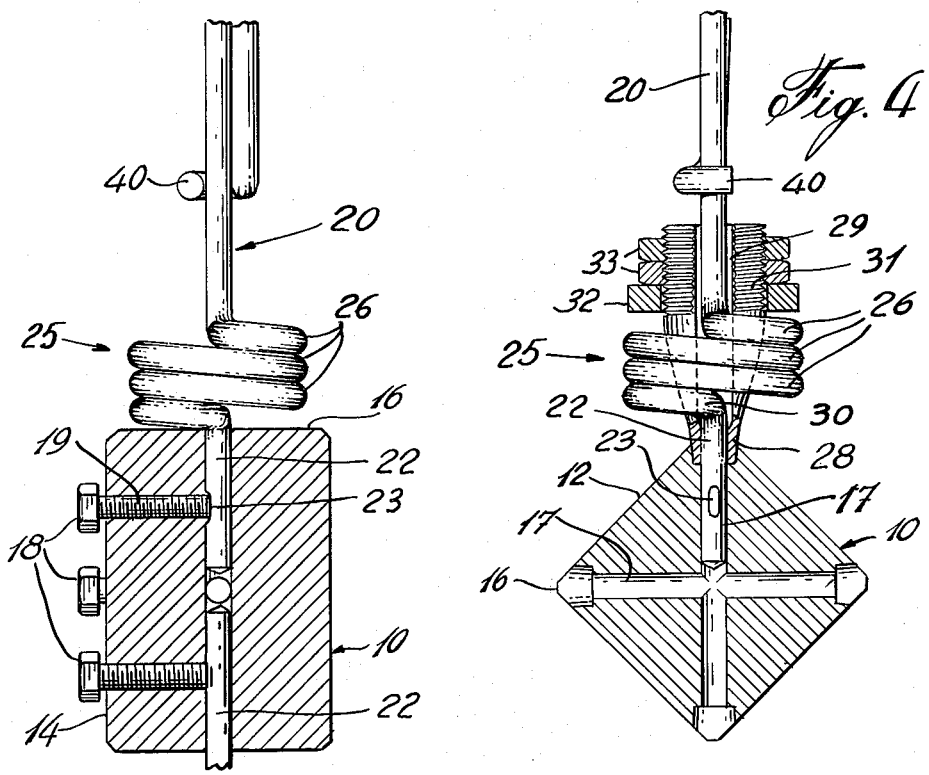
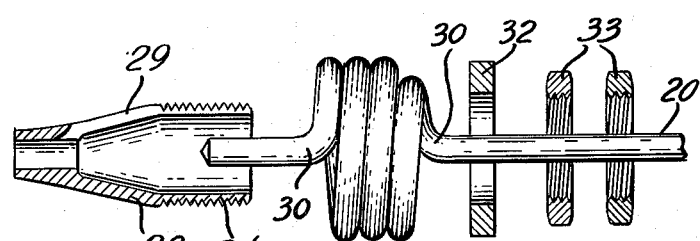

DAMPER SPACER FOR BUNDLE CONDUCTOR

INTRODUCTION

The present invention relates to a new and improved damper spacer for use in conjunction with bundle conductors of electric power transmission lines.

BACKGROUND OF THE INVENTION

It is common practice, nowadays, in the technology of bulk electric power transmission, to provide, with respect to each phase of the current, a number of spaced apart parallel conductors; these are disposed according to a particular geometrical pattern and the distances which separate them are relatively small by comparison with the distances that separate them, as a group or bundle, from other similar groups or bundles of the same transmission line. Each group of the line conductors that thus collectively carries electrical currents of the same phase is referred to as a bundle.

It is also common practice to insert within each bundle and at random intervals in the spans thereof that extend between the consecutive power line towers, one or more spacer damper devices of the kind to which the present invention relates; such devices are used, as their name implies, to serve the double purpose of restoring the spacing and geometrical pattern of distribution of the conductors and of preventing, by damping, undue oscillation movements from gradually building up in any one or more of the conductors of the bundle.

Such damper spacer devices are known in the art and a number of them have been disclosed in references, of class 174 subclass 42 of the U.S. Patent Office Classification System; one of these, for instance, is U.S. Pat. No. 3,567,841 of Mar. 2, 1971 to Kobayshi, M. wherein there is disclosed a damper spacer in which a number of rigid radially extending members are inserted in a hollow main body member wherein they are separated from adjacent others by distinct elastic cushioning bodies.

SUMMARY OF INVENTION

It is an object of the present invention to provide a conductor spacer that can ensure the proper maintenance of a predetermined distance between the adjoining conductors of each bundle thereof and, simultaneously, serve as a shock absorber or damper to prevent the setting of any of the conductors into uncontrolled and self-amplifying oscillatory motion.

A further object of the invention is to provide a damper spacer of such simple construction that it can very easily and rapidly be assembled and installed without requiring the use therefore of special tools, and which can just as easily and rapidly be serviced and repaired.

The damper spacer of the present invention essentially comprises only a few basic and easily assembled components: a massive main body member and a plurality of outwardly projecting radial arm members, the number of which corresponds to that of the conductors making up the bundle.

The inner end portion of each radial arm member is adapted to be inserted in a corresponding radial bore of the massive main body and to be fixedly secured in position therein. Adjacent the inner inner end portion thereof, each radial arm member presents a short integrally formed helical coil spring portion, the axial direction of which is parallel to, and coincides with, the axial directions of the straight portions of the arm that extend from opposite ends thereof. From the outer end of the short helical coil spring portion thereof, each radial arm extends outwardly as a slender and relatively rigid metal rod at the outer end of which there is a conductor gripping portion. The bulk of the flexibility of each radial arm member is concentrated at and derived from the helical coil spring portion thereof.

According to a preferred embodiment of the invention, means can additionally be provided, whereby to effectively set and adjustably regulate the maximum degree of the deflection that can take place at any time within the length of the helical coil portion of each radial arm member.

As it happens that, more often than not, in practice, bundles are made up of four conductors which are arranged in a rectangular pattern, most damper spacers comprise four radial arm members and are referred to as spacers or spreader crosses.

A better understanding of the invention will be derived from consideration of the following detailed description of embodiments thereof and by reference to the accompanying drawings wherein:

FIG. 3 is a side elevation of one of the radial arm members of same, showing a part of the main body member thereof in cross section;

FIG. 4 is a fractional plan view, partly in cross section, of one of the radial arm members according to a further embodiment of the invention and corresponding cross sectional view of the main body member thereof;

FIG. 5 is an exploded fractional plan view partly in cross section of the inner end of the radial arm member shown in FIG. 4;

Figure 6:
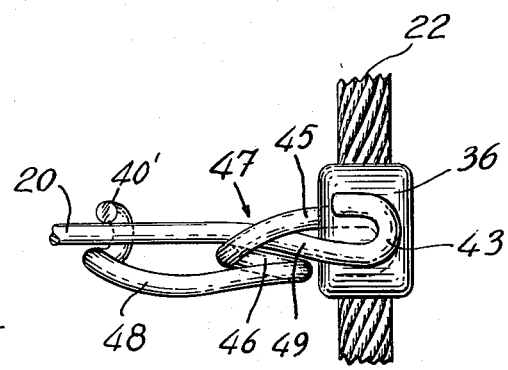
Figure 7:
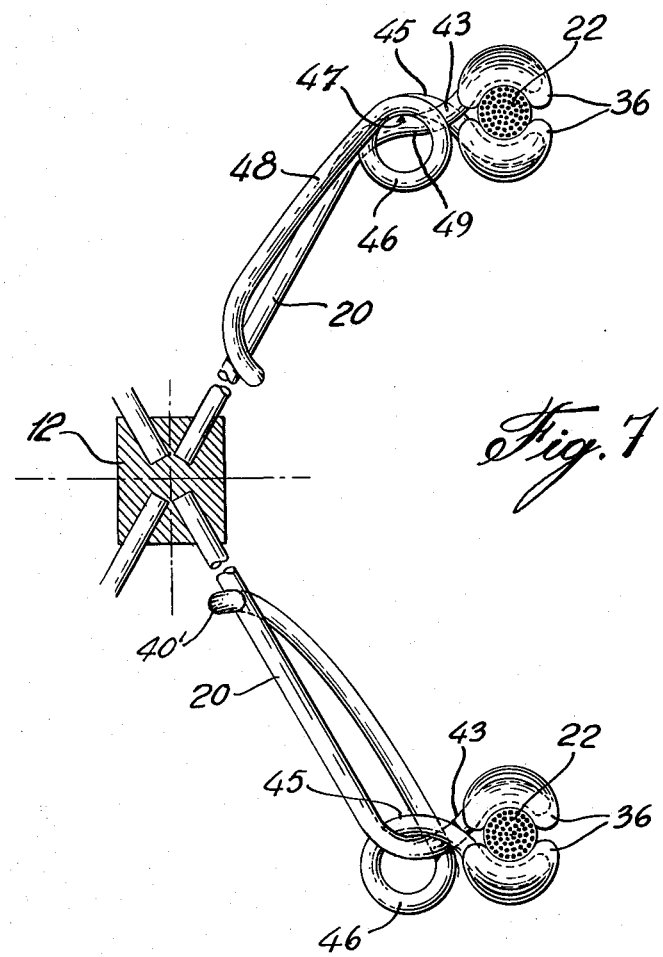

FIG. 6 is a fractional elevation of a damper spacer radial arm member and particularly showing the detail of an alternative form of the conductor gripping means thereof; and, FIG. 7 is a fractional plan view of a damper spacer device of the invention particularly showing the relative geometrical disposition of two angularly consecutive alternative conductor gripping means of the kind particularly shown in FIG. 6.

The spreader cross for damper spacer of the invention essentially comprises a centrally disposed main body member 10 and a number of radial arm members 20 extending radially away therefrom in a common plane generally normal to the axial direction of the conductors 22 which, collectively, constitute one of the bundles of conductors of the power transmission line; the transmission line comprising as many such bundles, normally, as there are phases of the electric current which are transmitted thereby.

Figure 1:
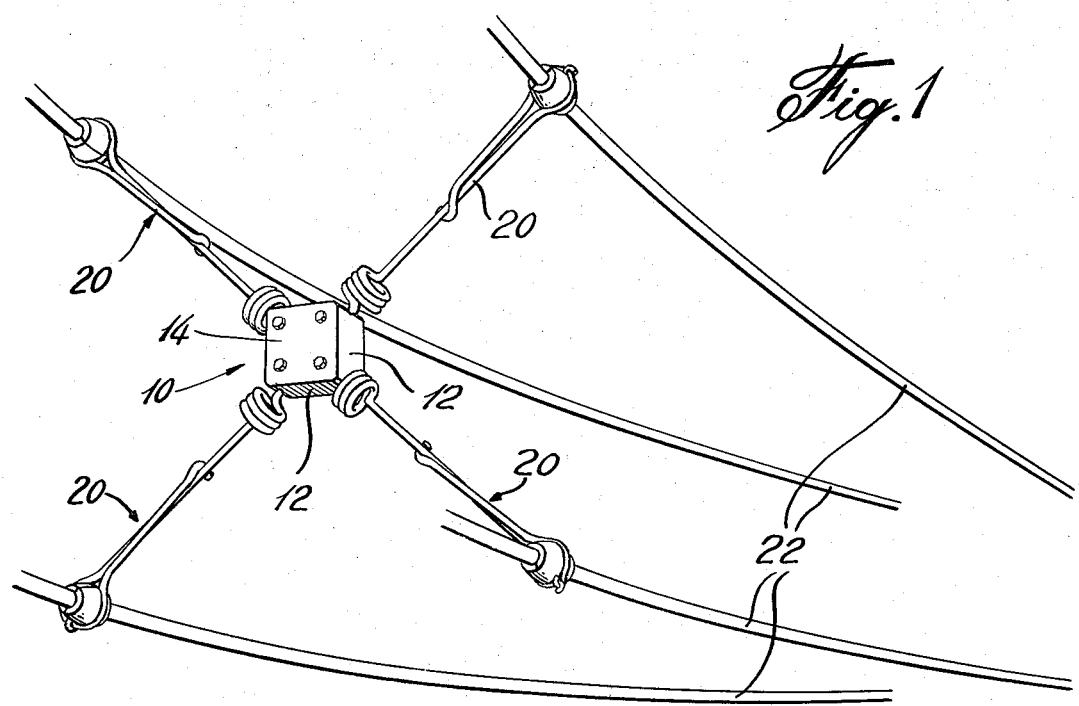
FIG. 1 is a perspective view of a damper spacer device according to a preferred embodiment of the present invention.

It should be obvious that the invention can similarly apply to power transmission lines wherein each phase of the current is carried by a bundle that comprises a greater or lesser number of conductors 22; generally the invention would prevail in all cases where the number of these conductors is greater than two, and preferably at least three. The main body member 10 is made as a massive metallic prismatic block wherein the number of equal prism faces 12 equals that of the conductors 22 comprised in the bundle. As particularly illustrated in FIG. 1 the main body member 10 is a four-sided prismatic body, the quadrilateral sectional outline of which is that of a square, but might in other instances, be rectangular or in the shape of a diamond; there is shown in FIGS. 6 and 7 for instance an embodiment of the invention wherein the cross sectional outline of the main body member 10 would preferably be rectangular.

Centrally between the ends 14 of the main body member 10 and along each edge 16 between consecutive side faces 12 thereof there is a radial bore 17. Each radial arm member 20 is generally formed as a steel rod, the inner end portion 22 of which is adapted to closely fit into any one of the bores 17 upon being inserted therein, and presents a flat or bevel facette 23 which, upon being engaged by the screw 18 causes the radial arm member 20 to become locked in position in the respective bore 17 and in such manner that there can be no rotation thereof about its own axis.

Screw 18 is threadedly engaged in a hole 19 that extends normally from one of the end faces 14 of the main body member 10 and is normally incident internally of the corresponding bore 17 at a point the position of which is intermediate between the inner and outer ends of the bore.

Figure 2:
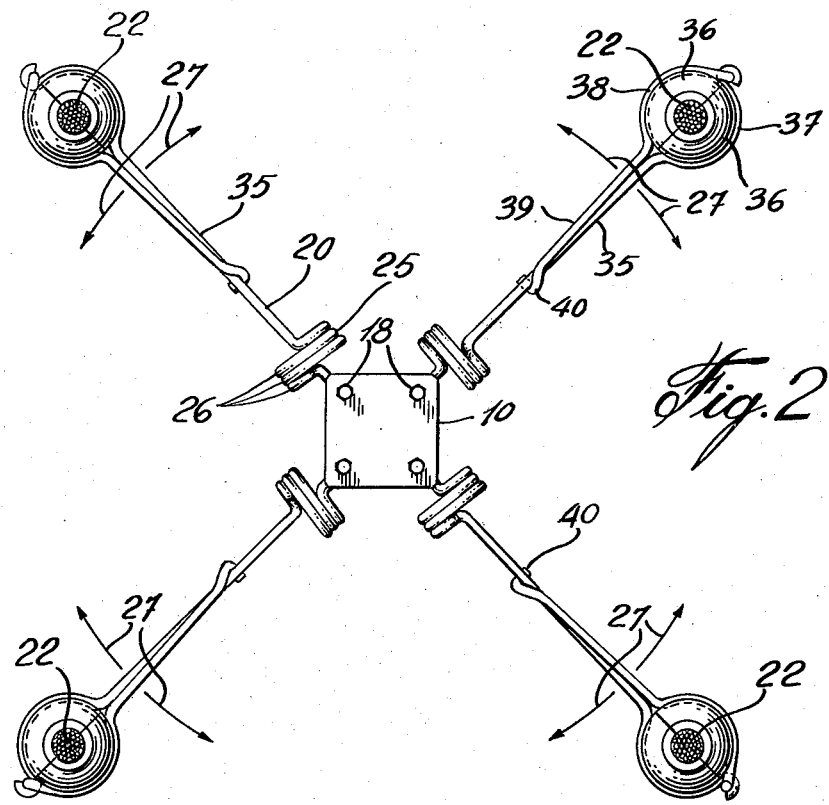
FIG. 2 is a plan view of the same.

Adjacent to the end portion 22 thereof that fits into the bore 17 of the main body member 10, each radial arm member 20 presents a short integrally formed helically coiled portion 25, the consecutive convolutions 26 of which are tightly packed as in an extension type coil spring. As the coiled portion 25 is made of the same rod material as the remainder of the radial arm members, i.e. a spring quality steel, it constitutes a reasonably stiff spring which is not too easily deformed but can, nevertheless, be caused to bend elastically to some extent upon application thereon of enough force with enough leverage, such as the forces applied thereon by the conductors 22 and in response to which the radial arm 20 will elastically deflect in one or the other of the directions such as generally shown in FIG. 2, by arrows 27; most of the bending action taking place within the relatively short length of the coiled portion 25.

As a precautionary measure and particularly for the purpose of making it impossible for the coiled portion 25 to be subjected to stresses of such magnitude that the elastic limits of the material are exceeded, there may be provided a limiting device such as shown in FIGS. 4 and 5. The limiting device comprises a tubular sleeve 28 which is particularly adapted to be inserted internally from the inner end thereof and extend through the helically coiled portion 25, the portion of sleeve 28 that extends internally of the helically coiled portion 25 presents a longitudinal slot 29 the width of which is sufficient to allow free extension therethrough or to allow free passage therethrough of the inwardly bent terminal portions 30 of the helically coiled portion 25. The outer end portion 31 of each sleeve 28 is preferably of enlarged diameter and exteriorly threaded; a large circular washer 32 is adapted to fit loosely around the outer end portion 31 of the sleeve 28, to come to rest over the outer end of the helically coiled portion 25 and loosely retained in position by means of nuts 33 engaging the exteriorly threaded end of the sleeve 28. The position, along the threaded end of the sleeve 28, in which the nuts 33 are interlocked, is what determines the maximum degree of the deflection that can take place in the helically coiled portion 25 of the radial arm 20.

At the outer end of the long stem portion 35 of each radial arm member 20 there are cable gripping means 36 whereby to secure same to the respective conductor 22. As shown in FIGS. 1 through 4 the means may advantageously consist of a complementary pair of generally semi-circular jaw liners 36 tightly secured in position around the conductor 22 by means of a pair of linkedly connected, nearly semi-circularly formed jaw members 37 and 38 which extend around the liners 36 and are forcibly retained in that position. The jaw member 37 is integrally formed at the outer end of the stem portion 35 and the jaw member 38 is linked thereto at the outer end thereof. At the inner end of the rearly semi-circularly formed jaw member 38 there is a radially extending stem 39 at the other end of which there is a normally bent hook 40; the stem portion 39 is forcibly brought to lie alongside the stem portion 35 of the radial arm and forced to remain in that position by causing the normally bent hook 40 to engage the stem 35.

It can be appreciated that each arm 20 can easily and rapidly be attached to the respective conductor 22 by simply positioning the shoes 36, closing the linked semi-circular jaws 37 and 38 around them, and using a screw drive or other prying implement to bring the stems 39 and 35 together and slightly beyond so as to allow the hook portion 40 to slip into engaging position behind stem 35.

There is shown in FIGS. 6 and 7 a further kind of cable gripping means wherein one jaw member 43 is integrally formed at the outer end of the radial arm member and the other jaw member 45 is a distinct part.

The separable jaw member 45 is particularly adapted to operate cooperatively with the respective radial arm member by scissor action through leverage thereof on the latter at the cross-over point 47 adjacent an integrally formed spring loop portion 46. From the spring loop 46 extends a leverage arm 48 which is adapted to be pried in position alongside the straight outer portion of the radial arm member 20 and retained therein by means of a normally bent hook portion 40' similar to the hook portion 40 in FIGS. 1 through 4.

It will be noted that in FIGS. 6 and 7 there is in each radial arm member 20 and adjacent the jaw portion 43 thereof, a short horizontally extending and outwardly bent length 49, the particular purpose of which is to provide a clearance around the upper half of the connection between each radial arm member 20 and the respective conductor 22 to permit the running thereover of the wheels of the small suspended cars commonly used by power line servicing crews and constitute the only safe, but not necessarily as inviting, means whereby to reach those portions of the line conductors that are suspended between and span across the long distances separating consecutive line towers.

I claim:

1. A damper spacer for use with bundle conductors comprising:
   a. a massive prismatic block-shaped main body member in which the number of prism faces is equal to the number of conductors in the bundle conductor;
   b. a plurality of radial arm members of spring steel rod material and numerically equal to the number of conductors in the bundle conductor; each radial arm member comprising, from its inner end consecutively toward its outer end, a short rectilinear portion, a short helically coiled coaxially extending portion, a long stem portion and a conductor gripping portion;

c. means securing each of said radial arm members to said main body member including, in said main body member, a corresponding number of radially extending, coplanar and angularly spaced apart bores normal to the axis of the main body member and equidistant from the ends thereof; each of said bores receiving the short rectilinear portion of one of the radial arm members;

d. means locking the short rectilinear portions in fixed positions in said bores, and e. wherein each of said radial arm members comprises adjustable means whereby to limit the amount of deflection within the short helically coiled portion thereof.

2. A damper spacer as claimed in claim 1, wherein said adjustable means comprise a cylindrical sleeve member presenting a longitudinally extending slot that extends from one end thereof to a point short of the other end thereof, and a threaded surface at the said one end, nuts engaged on said threaded surface and a circular disc freely engaged along the said cylindrical sleeve member, said cylindrical sleeve member extending axially through the inside of the helically coiled portion of the radial arm member.

3. A damper spacer as claimed in claim 2 wherein the conductor gripping portion of each radial arm member comprises a pair of complementary jaw members, each presenting a semi-circular profile, one of which is integrally formed at the outer end of the radial arm member, and the other of which is formed at the end of the other jaw member and presents a leverage arm, said jaw members being adapted for pivotal closure movement of one relatively to the other around a point closely adjacent their semi-circular profiles, by forcibly bringing the leverage arm to lie in closely parallel relationship with and alongside the long stem portion of the arm.

4. A damper spacer as claimed in claim 3 wherein the said leverage arm presents at the end thereof opposite that of the jaw member a normally bent hook portion adapted for engagement on and to the long stem portion of the radial arm member in such manner as to prevent return of the leverage arm to its original position once it has been forcibly brought to lie in closely parallel relationship with and alongside the said long stem portion of the arm.

* * * * *